Patented Mar. 7, 1933

1,900,350

UNITED STATES PATENT OFFICE

GEORG KRÄNZLEIN AND PAUL OCHWAT, OF FRANKFORT-ON-THE-MAIN-HOCHST, GERMANY, ASSIGNORS TO GENERAL ANILINE WORKS, INC., OF NEW YORK, N. Y., A CORPORATION OF DELAWARE

VAT DYESTUFFS OF THE ANTHRACENE SERIES

No Drawing. Application filed August 21, 1928, Serial No. 301,166, and in Germany September 7, 1927.

This invention relates to vat dyestuffs of the anthracene series.

We have found that the dyestuffs described in German Patent Specifications Nos. 240,080 and 251,350 and in U. S. Patent Specification No. 999,798 obtainable by condensation with aluminium chloride of alpha, alpha 1.5- or alpha, alpha 1.8-trianthrimide and in German Patent Specification No. 230,407 obtainable by an alkaline condensation of these trianthrimides and having probably the following constitutional formula:

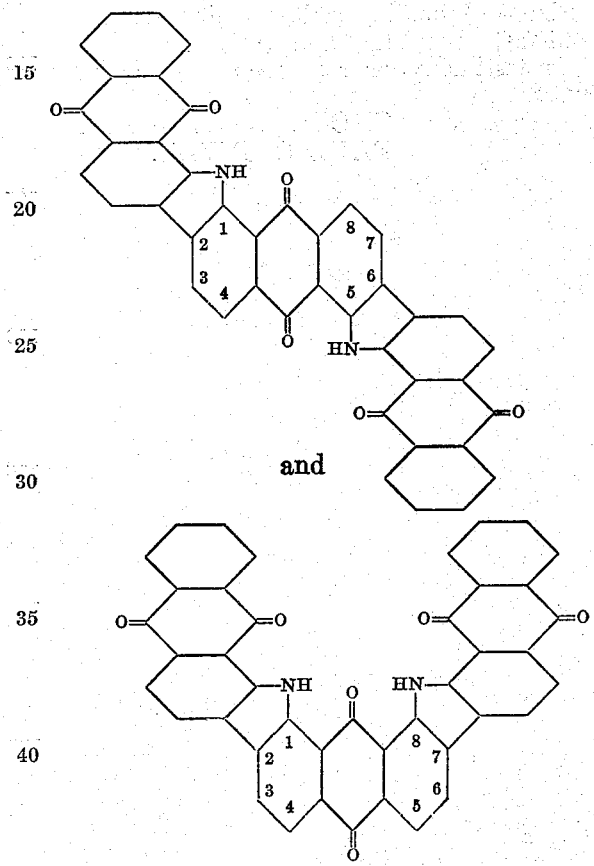

respectively, can be transformed into new dyestuffs by cautiously treating them with concentrated sulfuric acid, pouring the product into water and oxidizing the paste thus obtained advantageously by means of a hypochlorite solution. The said new dyestuffs have the advantage over the dyestuffs used as starting materials that they give considerably more vivid shades. It is surprising that in the above described manner clear dyestuffs are obtained since, for example, the dyestuff from alpha, alpha 1.4-trianthrimide which has a similar constitution does not at all stand such a treatment. As is known the dyestuffs obtainable by fusion of anthrimides are distinguished by extraordinary good fastness properties so that our present invention is of great value.

To more clearly explain our invention, we give herewith a single example, but it is to be understood that we do not limit ourselves to the details of this example. The parts are by weight:

200 parts of the dyestuff of the following probable formula

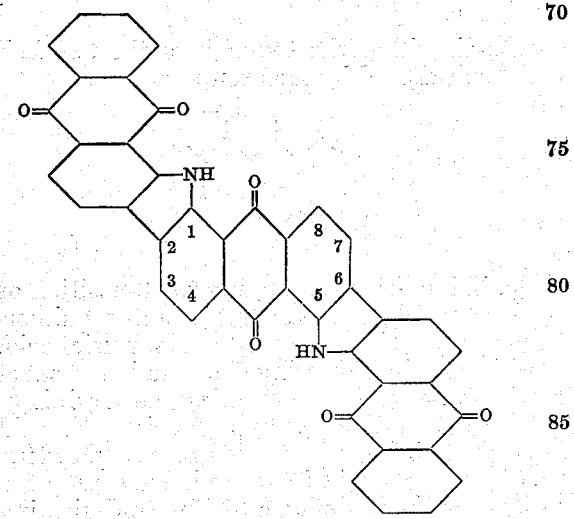

obtainable according to Example 2 of German Patent Specification No. 240,080 above referred to are dispersed in 2500 parts of sulfuric acid monohydrate at a temperature below 5° C. and the mixture is stirred for 24 hours. The resulting magna is poured on ice, filtered by suction and washed until neutral. The residue is rubbed up with water to form a fine paste which is treated at 70° C. to 80° C. with a sodium hypochlorite solution until after 3 hours no more hypochlorite is consumed and an excess of hypochlorite may be detected with potassium iodide starch paper. The paste thus obtained is bright orange whereas the starting material has a brown color. The paste when dried forms an orange-yellow powder whereas the parent dyestuff is dark brown. The color of its solution in concentrated sulfuric acid is bluish-violet whereas the fusion product dissolves in concentrated sulfuric acid to a reddish-violet solution. The clear yellow dyestuff is remarkable for its good fastness to light and washing.

The analogous treatment of the dyestuff from 1.8-alpha, alpha-trianthrimide takes a similar course.

We claim:

1. As new products, dyestuffs substantially identical with those obtainable by treating a dyestuff of the following probable constitution:

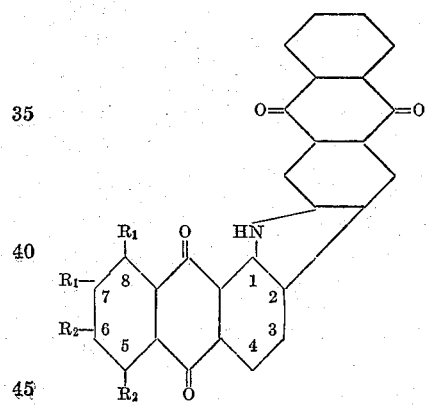

wherein either the two $R_1$'s or the two $R_2$'s are substituted by the group

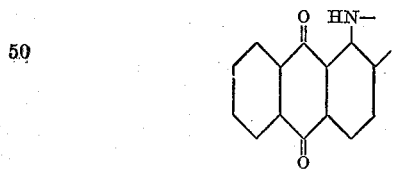

the imino group occupying the 8-position or the 5-position in the central anthraquinone molecule, with concentrated sulfuric acid, while cooling, diluting the reaction product with water and after-treating the precipitate with a solution of hypochlorite, the said products being when dried orange powders, sparingly soluble in organic solvents, of a high melting point over 360° C. and yielding yellow to orange dyeings of excellent fastness to light and washing.

2. As a new product, the dyestuff substantially identical with the dyestuff obtainable by treating the dyestuff of the following probable constitution:

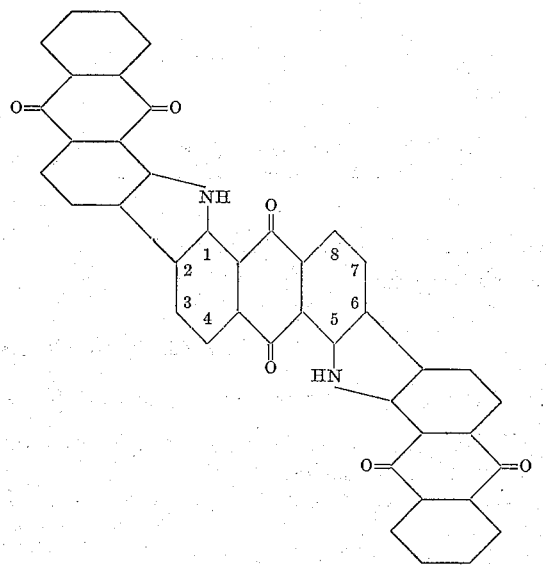

with sulfuric acid monohydrate at a temperature below 5° C. for several hours, diluting the reaction product with ice and treating the precipitate at 70° to 80° C. with a solution of sodium hypochlorite, said products being when dried, an orange-yellow powder, soluble in sulfuric acid to a bluish-violet solution and yielding yellow dyeings of excellent fastness to light and washing.

In testimony whereof, we affix our signatures.

GEORG KRÄNZLEIN.
PAUL OCHWAT.